United States Patent [19]
Fulk

[11] Patent Number: 5,909,576
[45] Date of Patent: Jun. 1, 1999

[54] METHOD AND APPARATUS FOR USING DEVICE DRIVERS OF A FIRST OPERATING SYSTEM, UNDER THE CONTROL OF A SECOND OPERATING SYSTEM

[75] Inventor: George Lee Fulk, Delray Beach, Fla.

[73] Assignee: International Business Machines Corporation, Armonk, N.Y.

[21] Appl. No.: 08/515,725

[22] Filed: Aug. 16, 1995

[51] Int. Cl.$^6$ .................................................. G06F 15/16
[52] U.S. Cl. ........................................... 395/681; 395/680
[58] Field of Search ...................................... 395/680, 681

[56] References Cited

U.S. PATENT DOCUMENTS

| | | | |
|---|---|---|---|
| 4,747,040 | 5/1988 | Blanset et al. ........................... | 395/678 |
| 4,835,677 | 5/1989 | Sato et al. ................................ | 395/406 |
| 5,067,072 | 11/1991 | Talati et al. ............................. | 395/708 |
| 5,109,515 | 4/1992 | Laggis et al. ............................ | 707/10 |
| 5,187,790 | 2/1993 | East et al. ................................ | 395/684 |
| 5,283,868 | 2/1994 | Baker et al. ........................ | 395/200.57 |
| 5,297,282 | 3/1994 | Meilak et al. ...................... | 395/750.05 |
| 5,392,619 | 2/1995 | Page et al. .......................... | 395/200.33 |
| 5,459,869 | 10/1995 | Spilo ........................................ | 395/700 |
| 5,519,833 | 5/1996 | Agranat et al. .......................... | 395/200 |

OTHER PUBLICATIONS

Finnegan, Windows. (DOS v. Windows v. OS/2), PC Magazine, vol. 11, No. 6, p. 347(1), Mar. 31, 1992.

Prosise, Jeff, Windows 95 and its Competitors, PC Magazine, pp. 1–10, May 16, 1995.

Schulman, Andrew, Windows 90+5, Dr. Dobbs Journal, pp. 1–6, Jan. 1995.

Pietrek, Matt, Stepping up to 32–bits:Chicago process, thread, and memory mang., 1–6, Aug. 1994.

*Primary Examiner*—Thomas C. Lee
*Assistant Examiner*—David Ton
*Attorney, Agent, or Firm*—Mark S. Walker; Andrew J. Dillon

[57] ABSTRACT

A method of and apparatus for using a device driver, or similarly system dependent software, of an operating system, which is single-tasking, in an operating system environment, which is multi-tasking. Each operating system operates according to known predefined driver models. The invention converts the calls from the multi-tasking system into calls of the single-tasking system by mapping the device driver command codes and entry points in accordance with the driver models of each operating system. The converted calls are provided to state logic, which also receives responses from the device driver. The state logic ensures that calls to the device driver are sequentialized, thus avoiding contention issues that may occur as a consequence of the multi-tasking environment and which the device driver may not have the appropriate functionality to handle. In this fashion, investments in system software, such as device drivers and TSRs, may be extended along the life of a subsequent operating system.

7 Claims, 6 Drawing Sheets

METHOD AND APPARATUS FOR USING DEVICE DRIVERS OF A FIRST OPERATING SYSTEM, UNDER THE CONTROL OF A SECOND OPERATING SYSTEM

FIELD OF THE INVENTION

This invention relates to a method and apparatus for allowing device drivers and the like of an operating system of a first type to be used by an operating system of a second type.

BACKGROUND

FIG. 1 illustrates the system architecture for a conventional computer system, such as an IBM PS/2® personal computer ("PC"). The exemplary computer system of FIG. 1 is for descriptive purposes only. Though the description below may refer to terms commonly used in describing particular computer systems, such as an IBM PS/2® PC, the concepts equally apply to other systems, including those having dissimilar architectures.

The exemplary computer 100 includes a central processing unit ("CPU") 105, which may include a conventional microprocessor; a random access memory ("RAM") 110 for temporary storage of information; a read only memory ("ROM") 115 for permanent storage of information; a diskette controller 140 for controlling a diskette 142 that may be inserted into computer 100; a disk controller 150 for controlling a hard disk 152 that is local to the computer 100; a keyboard and mouse controller 155 for controlling a keyboard input device 156 and a mouse input device 157; a DMA controller 160 for performing direct memory access to RAM 110; a video controller 165 for controlling a video output display 170; a memory controller 120 for controlling RAM 110; a bus controller 125 for controlling bus 130; and an interrupt controller 135 for receiving and processing various interrupt signals. Communication controller 145 communicates via medium 147 to a network. Controller 145 may correspond to a local area network communication controller, for example, or a modem controller. Similarly, medium 147 may correspond to a tangible medium, such as local area network cable or a telephone link. Or, medium 147 may use wireless techniques, such as microwave or infrared transmission techniques.

The computer 100 is generally controlled and coordinated by operating system software, such as the OS/2® or DOS operating systems, developed and sold by the International Business Machines Corporation ("IBM"), Boca Raton, Fla. Conventional operating systems perform memory management, provide file system services, provide networking and I/O services, provide a user interface, such as a graphical user interface ("GUI"), and the like. User applications, such as editors and spread sheets, directly or indirectly, rely on these and other capabilities.

As is known in the art, operating systems often include most, if not all, of the above functionality; some provide more; some provide less. To better understand the system structure of two conventional operating systems, the following sections are provided.

1. Review of the DOS Operating System

FIG. 2 illustrates the DOS system structure 200. A user shell 201a, utilities 201b, application programs 201c, and terminate-and-stay-resident ("TSR") modules 201d generally form an outermost layer of the DOS operating system 200. The user shell 201a provides a user environment, including a prompt, and a command interpreter so that the computer may receive and process user commands. The outer layer of the operating system may directly use the inner layers, as well as the functionality of the other portions of the outer layer 201.

The next inner layer is the application-program interface ("API") layer 202, which provides an interface between the DOS kernel 203 and the outer layer 201. Consequently, the outer layers need understand only the level of abstraction defined by the API interface 202. Thus, application programs and the like may be developed without any regard as to the actual implementation of the kernel and other inner layers.

The next inner layer 203 is the DOS kernel. The DOS kernel provides known system supervisor functions.

The next inner layer 204 corresponds to the device drivers. Device drivers communicate with I/O devices and the like. As is known in the art, device drivers are highly hardware specific. The DOS operating system mandates a particular corresponding "device driver model." The device driver model defines a method of communication between the device driver and the DOS kernel. In some instances the device driver will communicate directly with the hardware. In other instances, device drivers may communicate with a ROM BIOS layer 205, which provides a layer of abstraction to the device driver. Among other things, the driver model defines the driver entry points that must be supported by a device driver to operate in the system and also defines the "calling conventions" for entering a driver.

As is known, DOS is a single-user, single-task system. Consequently, once a task gains control of the system, the task retains control until it has completed execution. Many system components, such as device drivers, rely upon this single-tasking paradigm of operation. For example, a DOS device driver may be constructed without functionality to handle contention issues. Under DOS, this is acceptable because the DOS operating system ensures that multiple processes will not run concurrently, and thus, multiple tasks cannot "contend" for a resource.

Those skilled in the art will appreciate that the above explanation is for descriptive purposes only and that the description of certain components has been simplified or omitted. Only those aspects that are material to understanding the invention are described. If a more detailed explanation is necessary, reference may be made to the numerous available materials that describe the DOS operating system in significant detail.

2. Review of the OS/2 operating system

The OS/2 operating system, unlike the DOS operating system, is a multi-tasking operating system. Under the OS/2 operating system, an application may request substantially more memory than under the DOS operating system. Moreover, multiple processes may concurrently execute and interact.

FIG. 3 illustrates the system structure 300 of the OS/2 operating system. As is readily seen, FIG. 3 is fairly similar construction to FIG. 2. A person skilled in the art, however, will appreciate that FIGS. 2 and 3 are at a high level of abstraction and that the implementations of the two systems are vastly dissimilar. For present purposes, this level of abstraction suffices, and the description of similar layers to those outlined above will not be repeated here, for the sake of brevity.

For purposes of understanding the invention, the principal difference between the DOS operating system and the OS/2 operating system is that the OS/2 operating system includes a layer 302a for dynamic link libraries "(DLLs)". DLLs are known and allow the binding of code and data in the DLL to be delayed, until the program or data of the DLL is actually loaded or until the program using the DLL specifically requests the operating system to dynamically link to the DLL.

3. Customer Investment and Compatability Issues

Over time, customers may make a substantial investment in a particular operating system. For example, customers may purchase various hardware devices, e.g., a magnetic tape reader, that are supported by device drivers of a particular operating system, such as DOS.

When a new operating system succeeds a prior operating system, often applications and other software are "ported" to the new operating system. "Porting" generally refers to the process of migrating the code to run under a new operating system. Sometimes this only involves recompiling source code; other times the code needs to be modified.

It is not uncommon for certain software—especially device drivers and other highly machine and/or operating system dependent software—to never be ported to a new operating system. This is so, because device drivers and the like are often written in lower level assembler code. As is known, low level code is more difficult to understand than higher level code. Consequently, software developers have difficulty deciphering the code, and this increases the porting cost. Further complicating the effort, device drivers and the like are usually constructed according to a device driver model that may be significantly different than that of the new operating system. Consequently, the porting effort will require developers who are proficient in both operating systems driver models, thus further encumbering the porting effort.

Other reasons may also affect the unavailability of a device driver and other software in a new operating system. For example, the company that originally provided the hardware and associated device driver may be out of business, or the company may have changed its product strategy to discontinue support for the device.

Consequently, users sometimes want to upgrade their computer system to use a new operating system, but are faced with the dilemma of losing a significant investment in their hardware and/or software. To this end, certain operating systems provide known compatibility functions to alleviate the loss.

For example, the OS/2 operating system allows the user to invoke a so-called "DOS session" through OS/2's multiple virtual DOS machine ("MVDM") facility. The MVDM feature is known and provides the user with a DOS environment, even though the OS/2 operating system is executing.

Theoretically, under MVDM, a DOS device driver may be installed into and used by a single DOS session. However, if two DOS sessions attempt to install and use the device driver, problems may likely result. This is so, not because of MVDM, but because the different sessions may contend for resources associated with the driver. As outlined above, the DOS driver was likely constructed for a single user, single tasking system in which such contention is not possible. Consequently, if two DOS sessions attempt to use the DOS driver contention may result, but the driver will have no mechanism to handle the contention. Data incoherency and other fatal errors, such as deadlock, may result.

Moreover, even if a user somehow ensures that a device driver will be installed and used by a single session only, the MVDM facility provides visibility to the device driver from a DOS emulated session. Consequently, though the user is able to use the driver, he or she is deprived of the full power of the OS/2 operating system because of the DOS emulation; for example, he or she is prevented from running large memory space multi-tasking, applications due to the DOS inherent constraints.

The description above made particular reference to DOS device drivers. The same concerns and problems are implicated for other DOS specific code, such as DOS network redirectors and terminate and stay resident modules ("TSRs") .

Consequently, it is an object of the present invention to provide a method and apparatus that allows users to use device drivers and other operating system specific code constructed for use in an operating system environment in an operating system environment of a different type.

It is another object of the present invention to provide compatibility to device drivers and the like of a first single-tasking operating system to applications running in a second multi-tasking operating system.

SUMMARY

The invention uses a novel installable file system (IFS), specifically created for the device drivers and other operating system specific software. Conventional mechanisms are used to route calls to the novel IFS. However, once the IFS receives the calls the IFS operates on the calls in a novel manner.

The novel IFS has a mechanism for converting calls of a first operating system type, e.g., API calls from OS/2, into calls of a second operating system type, e.g., calls to the appropriate DOS, not OS/2, entry points of a driver. The conversion mechanism includes mapping logic so that the commands to the driver are issued with the correct codes for the particular target operating system. Thus, if a file open command has a first numerical code and is issued to a first entry point in the OS/2 environment, but a different code and entry point for a corresponding function is needed in the DOS system, the conversion mechanism handles the mapping.

Because the underlying construction and functionality of the device driver is unknown and may not have functionality to handle contention over the device, the novel IFS includes state logic to appropriately sequentialize access to the device driver, thereby avoiding contention.

The use of an IFS is exemplary and not limiting. Other operating systems may exploit the inventive concepts with analogous mechanisms, such as linked libraries and the like.

BRIEF DESCRIPTION OF THE DRAWINGS

The above and further advantages of the invention may be better understood by referring to the following description in conjunction with the accompanying drawings and which.

DETAILED DESCRIPTION

Figure 1:
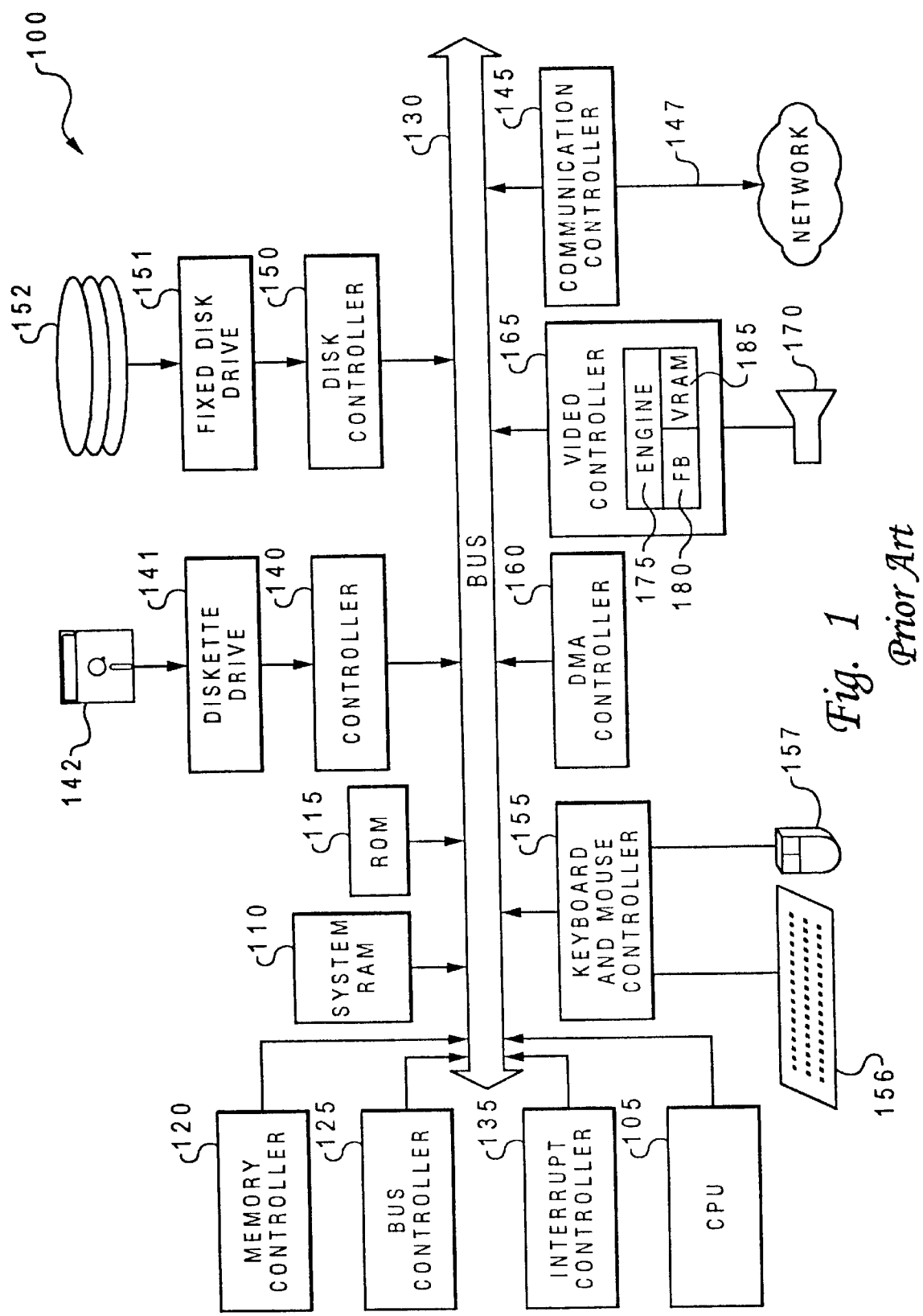
FIG. 1 illustrates a computer system.
Figure 2:
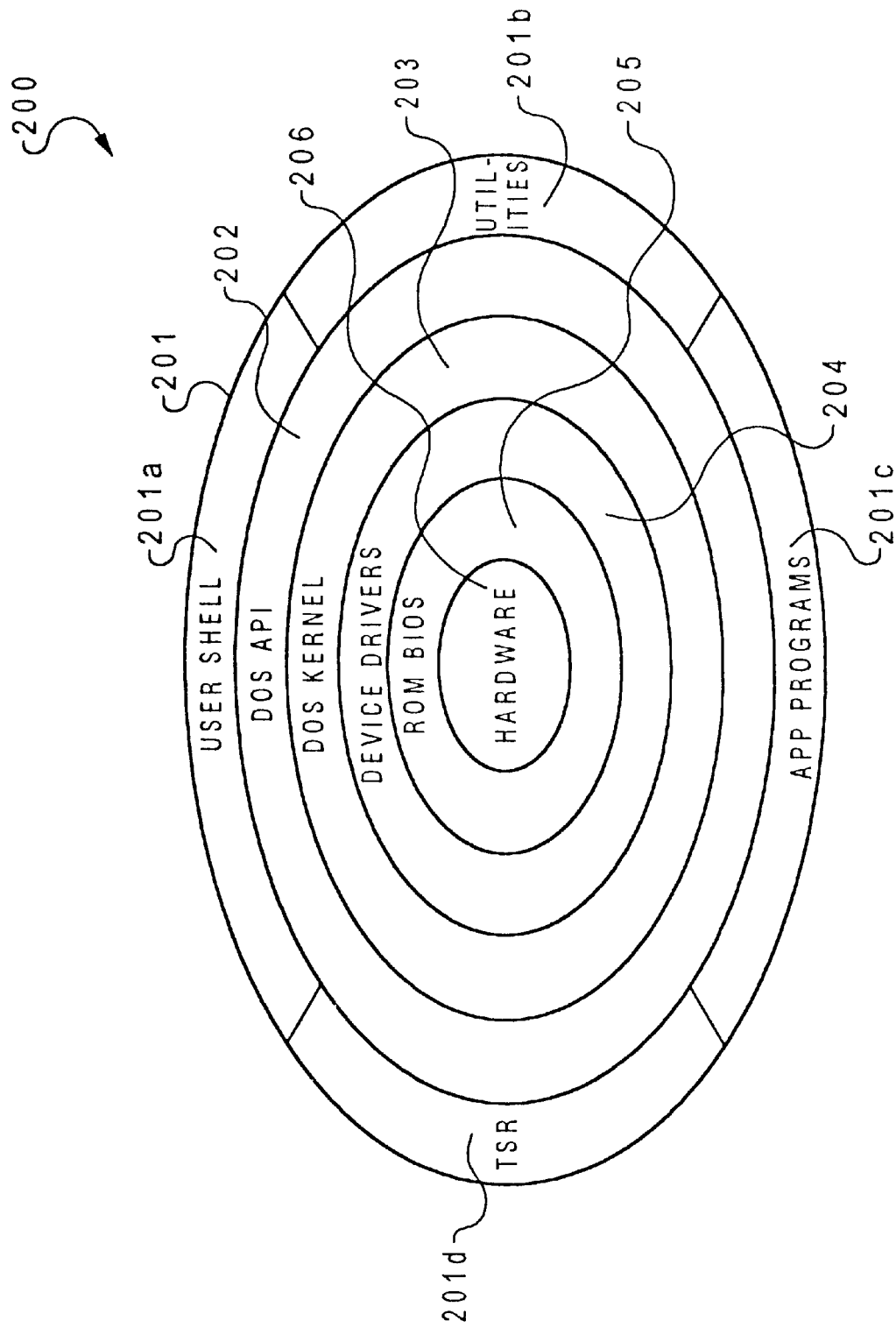
FIG. 2 illustrates the system structure of the DOS operating system.
Figure 3:
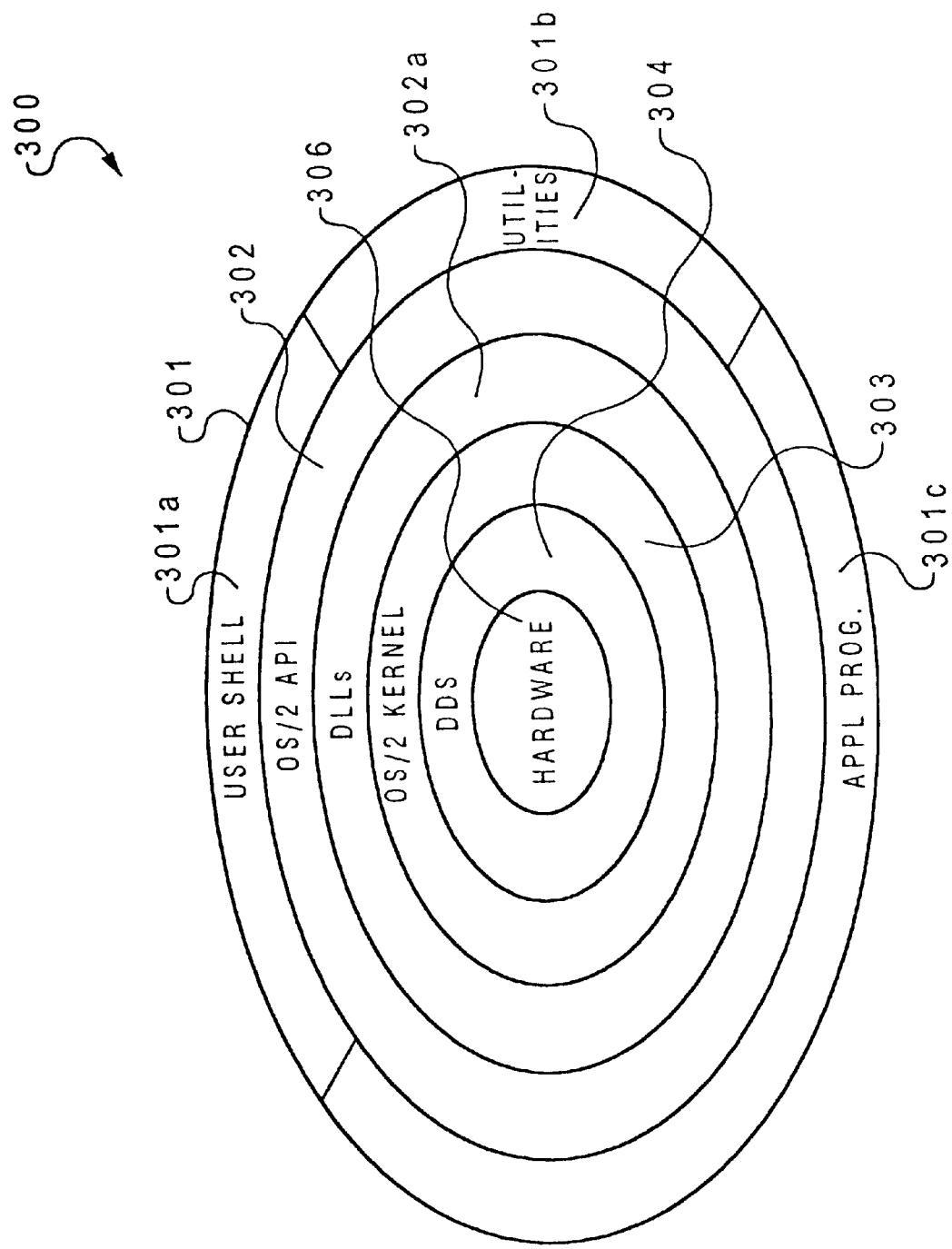
FIG. 3 illustrates the system structure of the OS/2 operating system.

The description below is made with particular reference to the DOS and OS/2 operating systems, sold and developed by IBM and discussed above. The invention may utilize a computer system similar to that discussed above with reference to FIG. 1, but skilled artisans will appreciate that the present invention is also applicable to other operating systems and to other hardware architectures.

A preferred embodiment of the invention uses special purpose software and known OS/2 operating system functionality so that DOS device drivers and the like may be used by software running under the OS/2 operating system. With the invention, an application may run under a complete OS/2 operating system environment and need not run under MVDM. Moreover, multiple concurrent processes running under the OS/2 operating system may concurrently request the use of the DOS device drivers and the like.

Since at least 1.2, versions the OS/2 operating system has provided an installable file system ("IFS") architecture. The IFS architecture is well known in the art and allows for the coexistence of multiple file systems. For example, the OS/2 operating system provides direct support for a so-called "FAT" (file allocation table) file system. Other file systems, such as the so-called "HPFS" file system, are implemented through an IFS. As is known in the art, an IFS is essentially a dynamically linked library ("DLL"). Like a DLL, an IFS provides "exports," or entry points, at which the IFS is be invoked.

Figure 4:
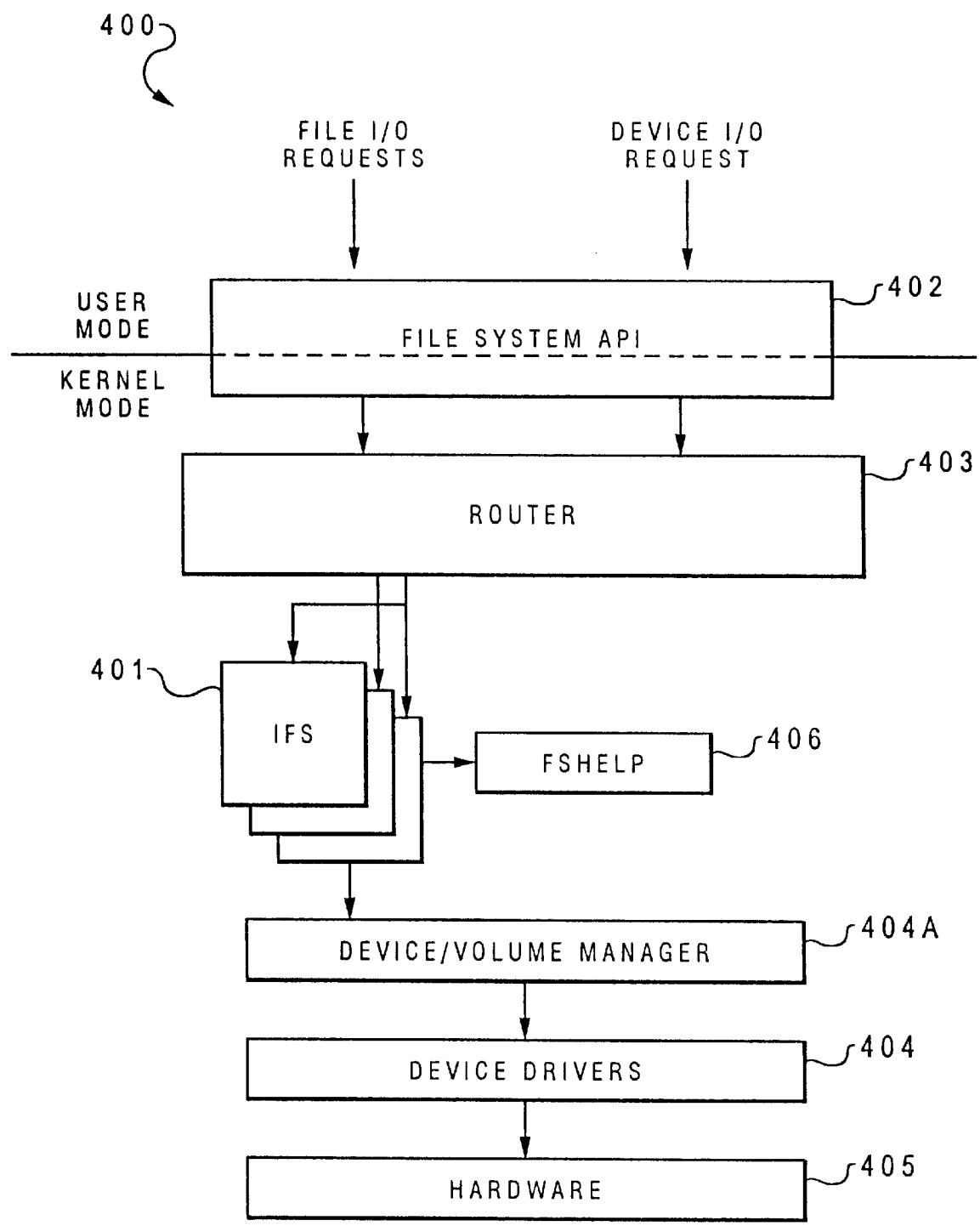
FIG. 4 illustrates the file system architecture of the OS/2 operating system.

FIG. 4 illustrates an IFS 401 in the context of the file and device I/O subsystem. An application program makes requests to a file by using a common file system API 402, known in the art. Software running under the OS/2 operating system will use the common API 402, regardless of the file system associated with the desired file. In turn, a portion of the OS/2 operating system, known as the file system router 403 ("FSR"), receives the API request and compares information contained in the request with information stored in internal data structures of the FSR. This is done to determine whether the file request is to a supported file system, such as the FAT file system, or whether it is to a "foreign" file system, i.e., one not directly supported by the OS/2 operating system, such as a CD-ROM file system.

If the request is to a foreign file system, the FSR 403 determines that a call to the corresponding IFS 401 is necessary. Each IFS 401 is constructed to support the requests that may be made by the file system API. Each supported request is implemented as an entry point, or export, of the IFS.

For example, if a request is made to open a file on a CD ROM controlled by a hypothetical CD ROM IFS, the FSR calls the CD ROM IFS and includes a code indicating that the IFS is to open the file. The CD ROM IFS will then communicate with a CD ROM device driver 404, which, as discussed above, is constructed according to the OS/2 operating system device driver model. The device driver 404, in turn, will communicate with the CD ROM hardware 405.

On the other hand, if an application requests a write to a CD ROM file—a function not supported by CD ROM technology—the request is still routed to the CD ROM IFS. The file system API 402 and the FSR 403 will not investigate the propriety of a particular function request, as they have no knowledge of a particular device's or IFS's functionality. Consequently, the FSR will call the CD ROM IFS 401 and include a code indicating that a write function is requested. The IFS 401 will be invoked at the entry point, or export, corresponding to a write function, and the CD ROM IFS will have the appropriate software to return an error code, indicating that the requested function is not supported by that IFS. The error code will propagate back to the application that requested the write, which will then take appropriate action.

As is known in the art, an IFS 401 communicates directly with a device driver 404 or with a device/volume manager 404a, which, in turn, communicates with the device driver 404. (Device/volume managers 404a are known and provide the ability to map logical block units to block device drivers.) In addition, as is also known in the art, the IFS architecture provides "helper" routines 406, which may be shared by all IFSs 401 and which provide commonly needed functionality.

Figure 5:
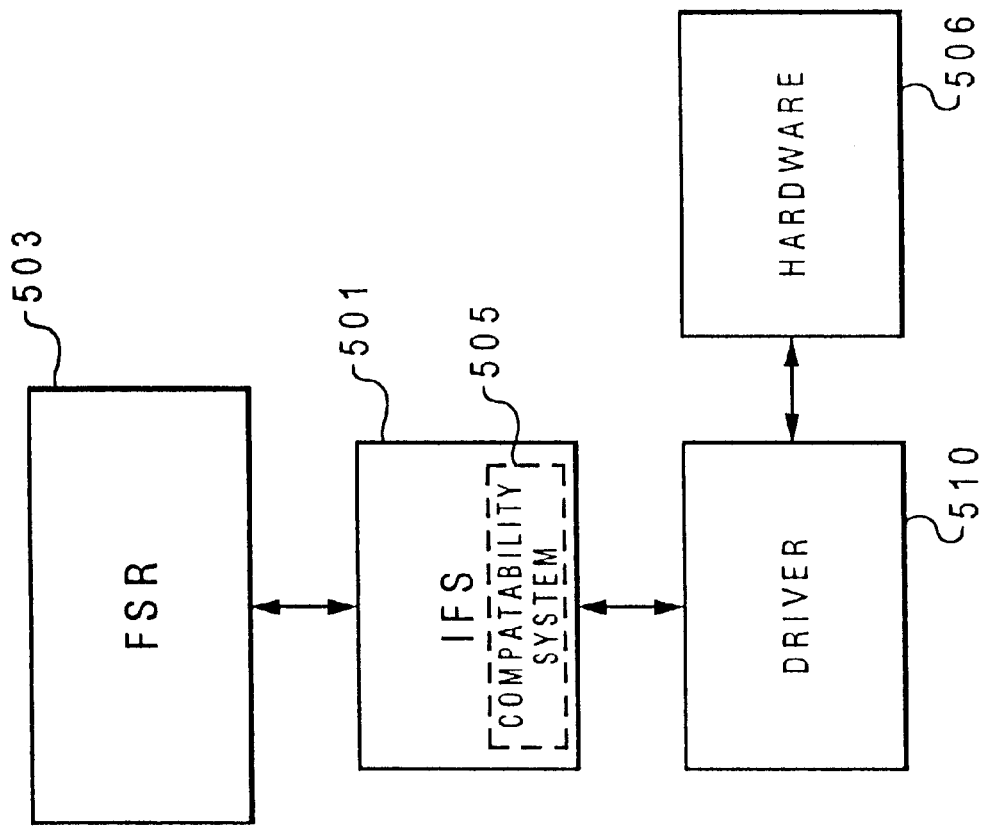
FIG. 5 an embodiment of the invention.

Referring to FIG. 5, the inventive compatibility system 505 is illustrated in the context of components outlined above. For example, FSR 503 is illustrated transmitting and receiving requests from IFS 501. IFS 501 includes compatibility system 505, discussed below.

Figure 6:
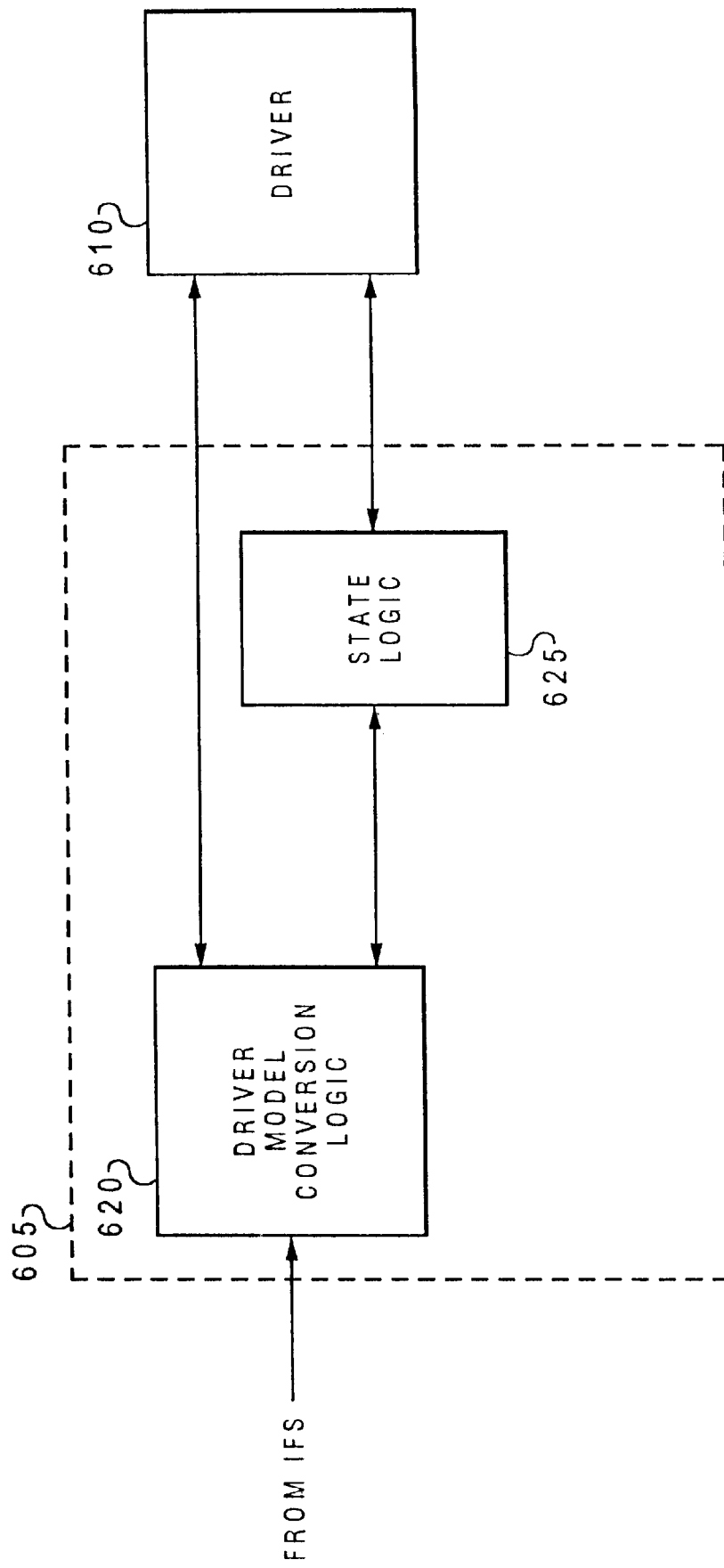
FIG. 6 an embodiment of the invention.

Referring to FIG. 6, compatibility system 605 includes driver model Conversion Logic 620 and State Logic 625. Conversion logic 620 performs the mapping between the two known driver models. Among other things, this logic ensures that an OS/2 operating system call is directed to the corresponding entry point for a DOS device driver. This includes mapping function codes and the like. Moreover, Conversion Logic 620 is responsible for insuring that the DOS calling convention is used (i.e., codes being loaded into the appropriate registers, etc), when calling the DOS driver.

As outlined above, device driver 610 may be constructed in a fashion that relies upon the single-tasking paradigm of the DOS operating system. Consequently, the device driver 610 is incapable of handling contention issues, which occur when two applications wish to use the same device driver. For example, device driver 610 may have issued a read request to a disk, but may not have received the actual read data yet. The driver 610 may not include the appropriate logic to lock out further requests to the device driver 610, because it may be relying on the DOS paradigm which would prohibit a subsequent application from attempting to use the driver. Consequently, state logic 625 provides the appropriate functionality to sequentialize access to the driver 610. For example, if a read is issued to driver 610, logic 625 insures that a subsequent action is not performed to driver 610, until driver 610 returns read data, thus placing the driver 610 in a state available for further activity. Persons skilled in the art will appreciate that the actual state transitions may be routinely determined given the description above and given that the entry points and associated functionality are known. The read example described above is exemplary only.

In an alternate embodiment, the invention may be implemented as a computer program product for use with a computer system. Such implementation may comprise a series of computer instructions either fixed on a tangible medium, such as a computer readable media, e.g. diskette 142, CD-ROM, ROM 115, or fixed disk 152 (FIG. 1), or transmittable to a computer system, via a modem or other interface device, such as communications controller 145 to the network, over a medium 147, which can be either a tangible medium, including but not limited to optical or analog communications lines, or use wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An apparatus for issuing file system calls from a first multi-tasking operating system, which is multi-tasking and operates according to a first driver model, to a device driver constructed for a second single-tasking operating system, which is single-tasking and operates according to a second driver model, the apparatus comprising:

A. means, responsive to the file system call, for converting the calls of the first operating system to converted calls in accordance with the second driver model and for receiving and converting responses from the device driver so that the responses from the device driver are also converted the first driver model; and B. means, responsive to the converting means, for sequentializing issuance of converted calls to the device driver so as to avoid contention over the device driver.

2. An apparatus for issuing file system calls from a first operating system, which is multi-tasking and operates according to a first driver model, to a device driver constructed for a second operating system, which is single-tasking and operates according to a second driver model, the file system calls being issued according to a common file system interface, the apparatus comprising:

A. file system router means, responsive to the file system calls, for receiving and routing the file system calls to one of a plurality of IFS B. An IFS associated with the device driver, the IFS having entry points in accordance with the first driver model and including
   means for converting the file system calls to converted calls in accordance with the second driver model; and state logic means, responsive to the converting means, for issuing the converted calls to the device driver and preventing the issuing of other calls until a response has been received by the state logic means from the device driver.

3. The apparatus of claim 2 wherein the converting means includes means for receiving and converting responses from the device driver so that responses from the driver are converted to the first driver model and wherein the state logic means includes means for receiving responses from the device driver and for determining whether the response should allow the issuing of other calls to the device driver.

4. A method of issuing file system calls from a first operating system, which is multi-tasking and operates according to a first driver model, to a device driver constructed for a second operating system, which is single-tasking and operates according to a driver model, the method comprising the steps of:

A. receiving the calls of the first operating system;

B. converting the received calls to converted calls in accordance with the second driver model and receiving and converting responses from the device driver so that the responses are converted to the first driver model; and C. sequentially issuing the converted calls to the device driver so as to avoid contention over the device driver.

5. A method of issuing file system calls from a first operating system, which is multi-tasking and operates according to a first driver model, to a device driver constructed for a second operating system, which is single-tasking and operates according to a second driver model, the file system calls being issued according to a common file system interface, the method comprising the steps of:

A. receiving and routing the file system calls to one of a plurality of IFS;

B. routing calls intended for the device driver to an IFS associated with the device driver, C. the IFS converting the file system calls to converted calls in accordance with the second driver model;

D. the IFS issuing the converted calls to the device driver; and

E. the IFS preventing the issuing of other calls to the device driver until a response has been received by the state machine logic means from the device driver.

6. The method of claim 5 wherein step C includes the step of

C.1 receiving and converting responses from the device driver so that the responses are converted to the first driver model, and wherein the method further includes the step of F. receiving responses from the device driver and determining whether the response should allow the issuing of other calls to the device driver.

7. A computer program product for use in a computer having a multi-tasking operating system, the computer program product comprising:

a computer usable medium having computer readable code means embodied in said medium for causing the computer to issue a file system call in accordance with a first driver model format, the call being directed to a device driver constructed to be operable in a single-tasking operating system and constructed in accordance with a predefined second driver model format, said computer program product further having;

computer readable code means for causing the computer to convert the file system call into a converted call in accordance with the second driver model format and for receiving and converting responses from the device driver so that the responses from the device driver are also converted to the first driver model; and computer readable code means for causing the computer to issue the converted call to the device driver while preventing the issuance of another converted call until a response has been received by the device driver.

* * * * *